United States Patent
Engle et al.

(10) Patent No.: US 9,054,397 B2
(45) Date of Patent: Jun. 9, 2015

(54) BATTERY CELL WITH INTEGRATED SENSING PLATFORM

(75) Inventors: Brian Allen Engle, Armada, MI (US); Emad Andarawis, Ballston Lake, NY (US); Ertugrul Berkcan, Clifton Park, NY (US); Canan Uslu Hardwicke, Simpsonville, SC (US); Aaron Jay Knobloch, Mechanicville, NY (US)

(73) Assignee: Amphenol Thermometrics, Inc., St. Marys, PA (US)

( * ) Notice: Subject to any disclaimer, the term of this patent is extended or adjusted under 35 U.S.C. 154(b) by 528 days.

(21) Appl. No.: 12/539,388

(22) Filed: Aug. 11, 2009

(65) Prior Publication Data

US 2011/0039137 A1    Feb. 17, 2011

(51) Int. Cl.
| | |
|---|---|
| *H01M 10/48* | (2006.01) |
| *H01M 10/42* | (2006.01) |
| *H01M 10/0525* | (2010.01) |
| *H01M 10/0585* | (2010.01) |

(52) U.S. Cl.
CPC ........ *H01M 10/486* (2013.01); *H01M 10/0525* (2013.01); *H01M 10/0585* (2013.01); *H01M 10/425* (2013.01); *H01M 10/48* (2013.01)

(58) Field of Classification Search
USPC .......................................................... 429/90
See application file for complete search history.

(56) References Cited

U.S. PATENT DOCUMENTS

| | | | |
|---|---|---|---|
| 5,795,664 A | | 8/1998 | Kelly |
| 5,909,004 A | | 6/1999 | Hedengren et al. |
| 6,152,597 A | * | 11/2000 | Potega .......................... 374/185 |
| 6,278,379 B1 | * | 8/2001 | Allen et al. ............... 340/870.16 |
| 6,384,607 B2 | | 5/2002 | Horie et al. |
| 6,444,350 B1 | | 9/2002 | Toya et al. |
| 6,919,725 B2 | | 7/2005 | Bertness et al. |
| 6,948,078 B2 | | 9/2005 | Odaohhara |
| 7,004,622 B2 | | 2/2006 | Hardwicke et al. |
| 7,351,290 B2 | | 4/2008 | Rutkowski et al. |
| 7,360,437 B2 | | 4/2008 | Hardwicke et al. |
| 8,104,358 B1 | * | 1/2012 | Jia et al. .......................... 73/780 |
| 2002/0163339 A1 | * | 11/2002 | Friel et al. |

(Continued)

FOREIGN PATENT DOCUMENTS

| | | |
|---|---|---|
| EP | 0807826 A2 | 11/1997 |
| WO | 2009036444 A2 | 3/2009 |

OTHER PUBLICATIONS

PCT/US2010/040540, International Search Report and Written Opinion, Sep. 29, 2010.

(Continued)

*Primary Examiner* — Patrick Ryan
*Assistant Examiner* — Lucas J O'Donnell
(74) *Attorney, Agent, or Firm* — Blank Rome LLP

(57) ABSTRACT

A battery cell that comprises a sensing platform with sensing elements configured to provide information about in-situ characteristics and parameters of the battery cell. Embodiments of the battery cell can have the sensing platform integrated into the structure of the battery cell, as a separate structure incorporated in the battery cell, and combinations thereof. In one embodiment, the battery cell comprises a sensing platform having sensing elements proximate a localized measurement region, where the sensing platform comprises a substrate with material layers disposed thereon. The material layers comprise at least one sensing layer that forms the sensing elements so that the sensing elements are responsive to properties of the battery cell.

17 Claims, 11 Drawing Sheets

(56) References Cited

U.S. PATENT DOCUMENTS

| | | |
|---|---|---|
| 2003/0027036 A1 | 2/2003 | Emori et al. |
| 2004/0257089 A1* | 12/2004 | Aridome |
| 2007/0182367 A1* | 8/2007 | Partovi .......................... 320/108 |
| 2008/0206627 A1* | 8/2008 | Wright ............................. 429/93 |
| 2008/0272742 A1* | 11/2008 | Hart et al. |
| 2009/0022206 A1* | 1/2009 | Shibuya et al. |
| 2009/0130545 A1* | 5/2009 | Wood et al. |
| 2009/0220827 A1* | 9/2009 | Knaggs et al. .................. 429/13 |
| 2011/0027633 A1* | 2/2011 | Deane et al. .................... 429/90 |

OTHER PUBLICATIONS

Direct-Write Technologies for Rapid Prototyping Applications, Pique, A., and Chrisey, D.B., Acad Press, 2002.

\* cited by examiner

SECTION B-B

SECTION C-C

SECTION D-D

BATTERY CELL WITH INTEGRATED SENSING PLATFORM

BACKGROUND OF THE INVENTION

The present invention relates generally to battery technology, and more particularly to battery cells that incorporate features for sensing in-situ characteristics and parameters of the battery cell.

Battery cells are implemented in various applications, such as those applications required for vehicle powertrain designs that rely on electrical traction power, e.g., hybrid-drive, and electric-drive vehicles. Such applications generally require that the battery cell not only output power on the scale of about 3V to 5V, but also retain favorable performance characteristics such as longer cycle life, increased robustness, and improved reliability. These demands are usually met by connecting arrays of battery cells together in series and/or parallel configurations to form larger, more complex battery packs. The design of battery packs, however, is difficult because of the delicate balance that is to be struck between maximizing efficiency and reliability, while retaining the necessary power output, and other performance characteristics of the battery cell, the battery pack, and the overall drive system. On the other hand, it is recognized that if the characteristics and the parameters of the battery cell were better understood (e.g., as through monitoring), then the battery cell could operate closer to its maximum limit. Such maximum limit could, in effect, be greater than the required scale mentioned above, but indeed greater than about 6V.

It has been found that to meet these design challenges there are benefits to providing battery cells of larger sizes. These advantages include a reduction in the number of cells that are needed to meet the target output power for a battery pack. A reduction in number of cells, in turn, minimizes cell-to-cell variations in the battery pack (by requiring less cells), and reduces the peripheral circuitry and electronics that is necessary to operate the battery pack. The end result is a reduction in the complexity that leads to lower system cost and higher reliability.

But while the larger cells may meet certain specific design criteria, incorporating cells of larger sizes into battery packs creates several design and functional challenges. These challenges include the uncontrolled heat generation that can occur in the event of cell failure. The challenges also include the lack of an efficient battery cell design that maximizes power output, while also maintaining reasonable operating temperatures.

These issues are particularly important because the performance characteristics of battery cells, e.g., prismatic battery cells, and related technology are very sensitive to characteristics of the physical processes that take place inside of the cell structure. That is, changes in one or more particular aspects of the cell can not only be detrimental to the performance of the cell, but also to the performance of the battery pack that incorporate numerous battery cells in a single package. For example, cell temperature is an indicator of the electrolytic reaction occurring within the ion exchange membrane in the battery cell. During high stress conditions, such as during aggressive charge and discharge events, the battery cell can generate excessive heat. This heat can deteriorate the battery cell, and in some cases result in thermal runaway, a condition in which an irreversible reaction occurs that results in the failure of the polymer ion exchange membrane. Thermal runaway and related conditions can also cause catastrophic failure of the individual cells. This failure is not only detrimental to the cell, but also to the battery pack that incorporates numerous cells in series/parallel configuration because the failure of one cell can cause an open-circuit condition across a series array of battery cells, as well as the deterioration of the performance of the battery pack.

Unfortunately the construction of battery cells is sensitive to local changes in geometry, as well as to localized forces that act on the structures of the battery cell. This sensitivity is such that it prevents many sensing devices (e.g., thermocouples, thermisters, and strain gages) from being implemented in and around the battery cells because these sensing devices have three-dimensional bodies and wiring that can cause localized deformation of the thin cell wall that are typically used to construct the battery cells. Moreover, since the battery packs are often being optimized for size, there is typically very little space between the battery cells for any type of sensing structure, let alone those that have expansive three-dimensional characteristics. Thus, in order to gather any information about the operating characteristics of the battery cells without disrupting its overall performance, discrete three-dimensional sensors can only be located around the edges of the battery cells. And due to packaging constraints at the battery pack level of construction, the sensors can only be placed at staggered distances throughout the outer periphery of the battery pack. For example, the constraints limit the available number of sensors to one (1) for every four (4) to eight (8) battery cells in the battery pack.

Due to the above constraints, the information that is gathered from the current generation of sensors is limited, slow, and in some cases inaccurate and misleading. For example, positioning temperature sensors on the exterior edges of the cells leads to inaccurate measurement of the cell temperature because the temperature at the edge of the cell is affected by ambient conditions that exist around the battery pack. The location of the sensor can cause measurements of the temperature at the edge to lag behind the actual temperature at the critical portions within the battery cell. Such poor correlation between the measured temperature and the actual temperature can compromise the battery pack because it is not a true reflection of the operating characteristics of the battery cells, and thus an inaccurate representation of the battery pack generally. Therefore, a better solution is to provide map of the temperature of the entire battery cell within the pack structure so as to minimize the thermal resistance between the sensor and the area within the battery structure Another limitation is the type of measurements that can be made using the current generation of sensors. As mentioned above, physical constraints generally restrict these sensors to locations at the periphery of the battery pack. So operating conditions such as pressure, ionic flow, and electrochemical processes can not be measured because these conditions require access to the interior of the cell.

Therefore, there is a need for a battery cell with improved operational characteristics. It is also desirable that this battery cell comprises, or is compatible with sensing, monitoring, and data gathering devices so as to provide and enrich the understanding of the operating parameters of the battery cell, the battery pack, and the overall drive system.

BRIEF DESCRIPTION OF THE INVENTION

In one embodiment, a battery cell comprising a first electrode, a second electrode positioned relative to the first electrode in a manner generating electrochemical activity between the first electrode and the second electrode, an active region responsive to the electrochemical activity, the active region comprising a localized measurement region exhibiting a cell property, and a sensing platform proximate the localized measurement region, the sensing platform comprising a sensing element for collecting data corresponding to the cell property in the localized measurement region.

In another embodiment, a battery cell exhibiting a cell property, said battery cell comprising a first electrode, a second electrode positioned relative to the first electrode in a manner generating electrochemical activity between the first electrode and the second electrode, a cell wall in surrounding relation to the first electrode and the second electrode, the cell wall comprising an outer surface, and an inner surface forming a cell volume, an active region responsive to the electrochemical activity, the active region comprising a localized measurement region exhibiting the cell property, and a sensing platform proximate the localized measurement region, the sensing platform comprising a sensing element substantially enclosed inside of the cell volume, the sensing element for collecting data corresponding to the cell property in the localized measurement region.

In still another embodiment, a battery cell for use in a battery pack, said battery cell comprising a first electrode, a second electrode positioned relative to the first electrode in a manner generating electrochemical activity between the first electrode and the second electrode, a cell wall in surrounding relation to the first electrode and the second electrode, the cell wall comprising an outer surface, and an inner surface forming a cell volume, an active region responsive to the electrochemical activity, the active region comprising a localized measurement region exhibiting the cell property, and a sensing platform proximate the localized measurement region, the sensing platform comprising a sensing element disposed on the outer surface of the cell wall, the sensing element for collecting data corresponding to the cell property in the localized measurement region.

BRIEF DESCRIPTION OF THE DRAWINGS

So that the manner in which the above recited features of the present invention can be understood in detail, a more particular description of the invention briefly summarized above, may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. The drawings are not necessarily to scale, emphasis generally being placed upon illustrating the principles of certain embodiments of invention.

Thus, for further understanding of the nature and objects of the invention, references can be made to the following detailed description, read in connection with the drawings in which.

DETAILED DESCRIPTION OF THE INVENTION

There is provided embodiments of a battery cell, which can comprise sensing elements used to measure in-situ characteristics and parameters indicative of the performance of the battery cell. Unlike the batteries discussed in the Background above, however, the embodiments of these battery cells are constructed in a manner that improves the accuracy and the response of the sensing elements as these factors relate to the observed in-situ characteristics and parameters. That is, the embodiments can locate the sensing elements closer to the active regions of the battery cell so as to reduce, and in some cases remove, factors that can affect the performance of sensing elements, as well as the overall performance of the battery cell. Additional details of this and other features of the present invention are provided in the examples of the battery cells below, some of which are illustrated and described in connection with FIGS. 1-11. Before continuing with that discussion, however, a general discussion of the battery cell, and the sensing elements that are used therein is provided immediately below.

With reference generally to the drawings, it is seen that battery cells of the type disclosed and described herein typically comprise a cell wall that forms an interior volume, which encloses the operative components (e.g., the electrodes) of the battery cell. The cell wall can comprise an outer surface, and an inner surface that is proximate the operative components. The battery cell can also comprise a sensing platform, wherein one or more of the sensing elements can be disposed, mounted, or otherwise affixed to the sensing platform.

The battery cell can also comprise an active region that is responsive to the electrochemical processes indicative of battery cells of the type contemplated herein. These regions react to the operation of the battery cell. These reactions can be instantiated by changes, which can include, but are not limited to, physical changes, electrical changes, mechanical changes, chemical changes, and electrochemical changes. In one example, the active region can comprise an electrolyte solution that is disposed in the cell wall. In another example, the active region can comprise portions of the cell wall. The active region can likewise be located variously amongst the structure of the cell wall. In one example, the active region can be wholly enclosed within the battery cell, such as if the cell wall were in surrounding relation to the active region. In another example, the active region can be located (in whole or in part) on one of the surfaces of the cell wall.

Figure 1:
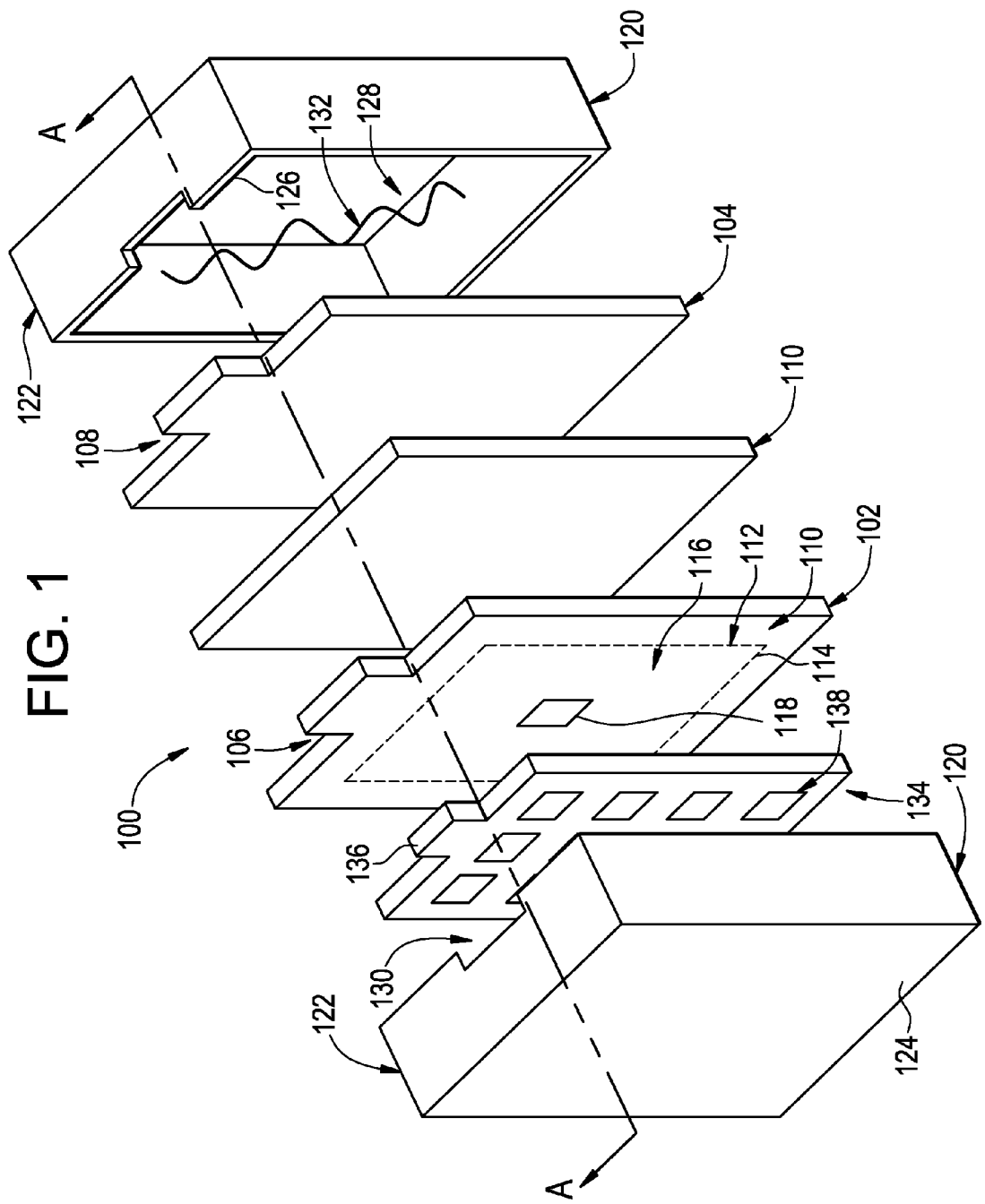
FIG. 1 is a top, perspective, exploded assembly view of an example of a battery cell that is made in accordance with concepts of the present invention.
Figure 2:
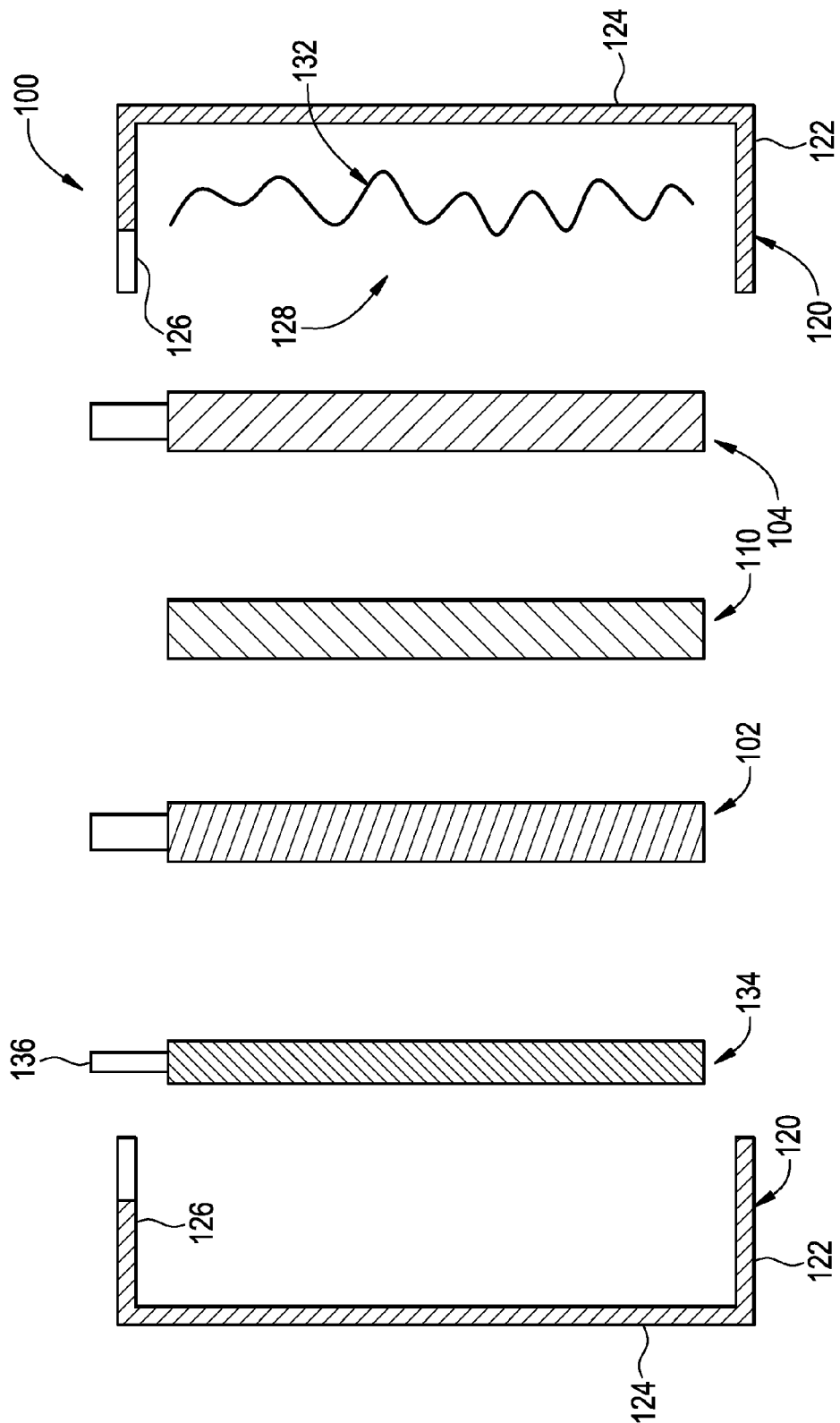
FIG. 2 is a side, cross-section view of the battery cell that is illustrated in FIG. 1.

The active region can comprise one or more localized measurement regions, as is illustrated in the example of a battery cell 100 of FIGS. 1 and 2. The localized measurement region is defined, in one embodiment, as where the properties of the battery cell can be measured using one or more of the sensing elements. In one example, the localized measurement regions can be found in portions of the battery cell that are generally not accessible with three-dimensional, or other discrete sensor devices. These portions can include areas between adjacent battery cells, (e.g., when the battery cells are assembled in a battery pack), as well as areas inside of the battery cell (e.g., areas substantially enclosed by the cell wall). In another example, the localized measurement region can be found in areas that provide data that is more accurate, reliable, and/or responsive than would normally be acquired using conventional measurement techniques.

In one embodiment of the battery cell, the localized measurement regions can be proximate to an element (e.g., the electrodes, the cell wall) in the battery cell, in contact with an element (e.g., the electrodes, the cell wall, the electrolyte) in the battery cell, at the interface of a plurality of element in the battery cell (e.g., the interface of the electrodes, the interface of the electrodes and the cell wall, the interface of the electrodes and the electrolyte, the interface of the cell wall and the electrolyte), and inside of the battery cell (e.g., wholly and partially enclosed within the cell wall, inside of the cell volume, extending into the cell volume). In one example, the localized measurement regions can be found on the inside of the battery cell, such as inside the volume or space defined by all or a portion of the cell wall. In another example, the localized measurement regions can be found at positions that are spaced away from the outer edges of cell wall, such as towards the interior portions of the battery cell, the interior portions of the cell volume, and away from the outer edges of the cell wall. In yet another example, the localized measurement regions can be found proximate the electrodes. In still another example, the localized measurement regions can be found proximate other components of the battery cell such as the porous membrane that separates the electrodes.

The sensing elements refer generally to any feature or component that is responsive to a physical stimulus, and which transmits a measurable impulse or signal as a result of that stimulus. For example, the sensing elements found in battery cells of the type contemplated herein can be used to measure properties of the battery cell. The term "property" is meant to include physical properties, and mechanical properties, as well as other functional properties that are consistent with battery cells and their related technology. By way of non-limiting examples, such properties can include temperature, pressure, stress, strain, electrical properties (e.g., current, voltage, resistance, resistivity), electro-chemical properties (e.g., ion concentration, transport characteristics, electro-chemical process characteristics), and any combinations, and permutations thereof. Examples of other properties that can be measured by the sensing elements can also include, but are not limited to, variables and other variable-dependent parameters and characteristic such as those variable that are time dependent, space correlated and/or dependent, time averaged and/or dependent, and cell memory based and/or dependent.

The sensing elements can be in the form of a conductor, e.g., an electrical or thermal conductor. Such conductors can include a wide variety of electrical wires which carry current such as, but not limited to, copper, aluminum, platinum, rhodium, nickel, gold, titanium, indium, and alloys which comprise amounts of these metals. The wires may carry current between features of the sensing element, the battery cell, and any attached component, e.g., a power source, an electrical detection component, a signal processor, and the like. The sensing element can also refer to any type of bonding site or joint between an end of a wire and some other portion of the device, or of the attached equipment. Exemplary sensing elements for measuring temperature can also include one or more of resistance temperature detection ("RTD") elements, thermistors, thermocouples, semiconductor devices including elements and devices that comprise PN junctions and similar discrete semiconductor components, and ionic components, among others. Exemplary sensing elements for measuring strain can also include one or more of foil devices, semiconductors, microelectricalmechanical systems ("MEMS") and MEMS-based devices, optical devices, and electromagnetic devices, among many others.

The sensing elements can also be in the form of a variety of electrically non-conducting materials. Examples of non-conducting materials can include ceramic and/or polymeric materials such as thermoplastic materials, thermosetting materials, and elastomeric materials (e.g., rubber compositions). These materials may themselves be responsive to the physical stimulus, e.g., by expanding in length or width under strain and/or temperature conditions. These materials may also be responsive when used in conjunction with one of the conductors mentioned above.

The sensing elements can be integrated into the sensing platform, which can be constructed of layers of materials that are applied to a substrate. In one embodiment, the substrate can be a thin film such as a polyimide film on which the layers of material are deposited to form the sensing elements. The thin film can be bonded to a surface of the battery cell, e.g., by using adhesive, welding, and laminating processes. In another embodiment, the substrate can be a surface of the battery cell, such as by forgoing the separate substrate (e.g., the thin film) in lieu of depositing at least one of the layers of material directly onto the surface of the cell well. A variety of processes can be used to deposit the material layers so as to construct the sensing platform (and the sensing elements) including screen printing, sputtering, thermal spraying, laminating, electron-beam deposition, electroplating, and physical evaporation, among many others. Some examples of the structure and the composition of the material layers for use with embodiments of the battery cell are discussed in connection with FIGS. 4 and 5 below. Generally, the sensing elements can be in the form of an array of sensing elements, a single sensing element, a distributed sensing element, as well as in spatially-oriented geometries that can comprise, but are not limited to, spatially differentiated, spatially correlated, and spatially averaged geometries.

The sensing platform can be positioned on the inside surface, as well as the outside surface of the cell wall. In one example, the sensing platform can be on the outside surface of the cell wall so that the sensing elements are separated from the interior of the battery cell by the cell wall. In another example, the sensing platform can be wholly enclosed within the battery cell such as by depositing the material layers, or securing the thin film with the material layers, directly to the surfaces inside of the battery cell.

The location of the sensing platform on either the inner or outer surfaces can provide improved feedback as to the operating conditions inside of the battery cell. Moreover, when the battery cells are packaged together into a battery pack, the location of the sensing elements on these surfaces permits collection of data in regions between adjacent ones of the battery cells. These regions are generally not accessible because of limitations that are found when implementing conventional techniques and equipment. This is beneficial because the data that is collected can be utilized to improve reliability models of the battery cell, to understand failure mechanisms, and to improve the overall design of the battery cells, the battery packs, and the various implementations and applications thereof, e.g., hybrid and electric vehicles.

In one implementation, the sensing elements can provide data on the behavior of the battery cell as part of a feedback control system. For example, the sensing elements can be coupled to a communication device that can transfer data and information to another data processing device. The other data processing device can be positioned outside of the cell wall. Examples of such communication devices can comprise a wireless RF device (e.g., near field devices, inductive and/or capacitive devices, and far field devices), an tether device, tether devices comprising electrical components, a serializer, a multiplexer, a demultiplexer, an optical connective device, optical devices comprising elements that transmit data via light (and/or other optical properties), a power line carrier device, an acoustic device, and acoustic devices comprising elements that transmit data via waves (e.g., sound waves). In other examples, the battery cell itself can be equipped with devices for storing, transmitting, receiving, and processing the data. These devices can comprise memory (e.g., non-volatile, volatile), as well as mechanical, electrical, or chemical devices that can process and aid in processing of data.

The feedback control system may comprise electrical circuits that can be constructed in a manner that interconnects a variety of electrical elements such as, but not limited to, resistors, capacitors, transistors, and switches. The circuits may further communicate with other circuits (and/or devices), which execute high-level logic functions, algorithms, as well as process firmware, and software instructions. Exemplary circuits of this type include, but are not limited to, field programmable gate arrays ("FPGAs"), and application specific integrated circuits ("ASICs"). Together these circuits and components can generally provide for the control structure that can be implemented to improve reliability models of the battery cell, to understand failure mechanisms, and to improve the overall design of the battery cells, as well as the various implementations and applications thereof, e.g., in hybrid and electric drive vehicles.

In view of the foregoing general discussion, and by way of non-limiting example, it is illustrated in FIGS. 1 and 2 an embodiment of a battery cell 100 that is made in accordance with the concepts of the present invention. At a high level, the battery cell 100 can comprise an anode 102, and a cathode 104, both of which can comprise, respectively, an anode terminal 106 and a cathode terminal 108. A membrane 110, which is generally constructed of porous materials, is disposed between the anode 102 and the cathode 104.

The battery cell 100 can also comprise an active region 112 with an outer edge 114 and an interior region 116, which is spaced toward the interior of the active region 112 from the outer edge 114. The active region 112 can comprise a localized measurement region 118, which can be defined as the region where the sensing elements collect data indicative of the in-situ characteristics and parameters of the battery cell 100. It is noted that although the active region 112 (and the localized measurement region 118) is illustrated proximate the anode 102, it will be understood that this representation is simply for purposes of example only and not meant to limit the scope and spirit of the present disclosure. That is, the active region 112 is representative of the portion of the battery cell that is responsive to the electrochemical activity that occurs as part of the operation of the battery cell 100. So the battery cell 100 can also have active regions, like the active region 112, which can also comprise other areas of the battery cell that are responsive to the electrochemical activity. be considered to comprise portions of the battery cell 100 that will, or can, in some way respond to the electrochemical reactions.

The battery cell 100 can further comprise an outer structure 120 that has a cell wall 122 with an outer surface 124 exposed to the environment, and an inner surface 126 which forms an inner volume 128. The cell wall 122 can comprise a sealed opening 130, out of which extend the anode terminal 106 and the cathode terminal 108. An activating solution 132 such as an electrolyte solution is disposed in the inner volume 128. The cell wall 122 is typically formed so that the electrodes, the membrane 110, and the activating solution 132 are encapsulated in the inner volume 128. This formation can include both multi-pieced structures (as shown), as well as unitarily constructed structures, both being formed in a manner that encapsulates the respective operative components of the battery cell 100.

Construction of the battery cell 100, and more particularly the electrodes, the membrane 110, and the outer structure 120 will be generally recognized by artisans having ordinary skill in the battery arts. The battery cell 100 can be particularly constructed so that, for example, the electrodes are configured to create a flow of ions across the membrane 110 and therefore generate an electric current. The current can be realized, e.g., by connecting a load such as a resistor or other device between the anode terminal 106 and the cathode terminal 108. In one example, the battery cell 100 can be a lithium ion ("Li-ion") battery, wherein the cell wall 122 is typically made, in whole or in part, of metals such as aluminum, or materials with material properties consistent with the requirements of the various types and applications of the battery cell 100.

As it is shown in the example of FIG. 1, the battery cell 100 can comprise at least one sensing platform 134 with a lead out terminal 136, which extends out of the sealed opening 130. The sensing platform 134 can also comprise one or more sensing elements 138, which in one embodiment can be configured (on the sensing platform 134) to collect data from the measurement region 118. While a plurality of the sensing elements 138 are illustrated, however, it is contemplated that the sensing platform 134 can comprise a single sensing element 138. As discussed above, the sensing elements 138 can be responsive to one or more of the characteristics and parameters of the battery cell 100 such as temperature, strain, current, voltage, and any combinations thereof.

The sensing platform 134 can be a separate structure, such as the structure illustrated in the example of FIG. 1, which can be bonded to the cell wall 122, and in certain embodiments to one or more of the outer surface 124 and the inner surface 126. The sensing platform 134 can also be integrated onto the cell wall 122 such as by deposition of layers of material onto one or more of the outer surface 124 and the inner surface 126 of the cell wall 122. In one embodiment of the battery cell 100, the sensing platform 134 is physically, and/or mechanically bonded to the cell wall 122 so as to locate the sensing elements in the measurement region 118. This is particularly useful when the sensing platform comprises a substrate such as a thin film substrate, and a thin film, organic substrate.

Suitable bonds can be formed using a variety of techniques and processes, some of which are provided immediately below.

In one example, adhesive material is deposited onto the cell wall 122 such as by using a doctor blade to achieve a proper thickness suitable for securing the substrate of the sensing platform 134 to the cell wall 122. Adhesives and adhesive materials that can be generally selected are not susceptible to degradation by dielectric or electrolytic solutions, such as the electrolyte solution that can be found inside the battery cell. Exemplary adhesives include silver-filled epoxies, as well as other exothermic cure adhesives, heat cure adhesives, and ultra-violet cure adhesives, among many others.

In another example, welding processes such as laser welding and ultrasonic welding can be utilized to form one or more of the mechanical bonds between the cell wall 122 and the substrate of the sensing platform 134. These bonds can include welds that secure the outer periphery of the substrate to the cell wall 122. These bonds can also include spot or point welds, which can couple individual points of the substrate and/or the sensing elements 138 to the cell wall 122. Spot welds may be particularly useful to avoid mechanical deformation of the cell wall 122 in the measurement region 118, and in particular when the sensing elements 138 are used for sensing temperature. Spot welds may also be useful to couple the sensing elements 138 to the cell wall 122 when the sensing elements 138 are used to measure strain that is, for example, realized on the cell wall 122.

In still another example, laminating can be used to apply materials to the cell wall 122 that can secure the substrate to the cell wall 122. These materials can be in the form of a laminating structure, e.g., a coating, a film, and other thin layers of material. An example of a process for providing the laminating structure includes thermal polymer welding, which can be used to seal and enclose the outer portions of the cell wall 122 so as to form the inner volume 128 of the battery cell 100.

In other embodiments of the battery cell 100, the sensing platform 134 can be constructed by depositing material, such as by depositing layers of material directly onto the cell wall 122. These techniques can be particularly useful when the substrate of the sensing platform 138 comprises one or more of the outer surface 124 and the inner surface 126 of the cell wall 122. A variety of processes can be used to deposit these material layers and construct the sensing platform in accordance with the concepts of the present invention.

In one example, the processes comprise direct-write techniques such as thermal spraying, paste deposition, and laser deposition. A description of processes, such as the processes discussed herein, can be had with reference to U.S. Pat. No. 7,004,622 to Hardwicke et al., U.S. Pat. No. 7,351,290 to Rutkowski et al., and Direct-Write Technologies for Rapid Prototyping Applications, Pique, A., and Chrisey, D. B., Acad Press, 2002. These processes can include a plasma process such as plasma spray processes that employ a generic direct current ("DC") thermal plasma torch, providing a stable electric arc between a cathode and an annular, water-cooled copper anode. A plasma gas (often argon or another inert gas) is introduced at the back of the spray gun interior. The gas swirls in a vortex, and then exits out of the front of the anode nozzle. The electric arc from the cathode to the anode completes the electric circuit, forming an exiting plasma flame. Those skilled in the art are familiar with variations in the general plasma spray process, and familiar with techniques for adapting this process, as well as other direct-writing techniques to a variety of deposition materials.

Figure 3:
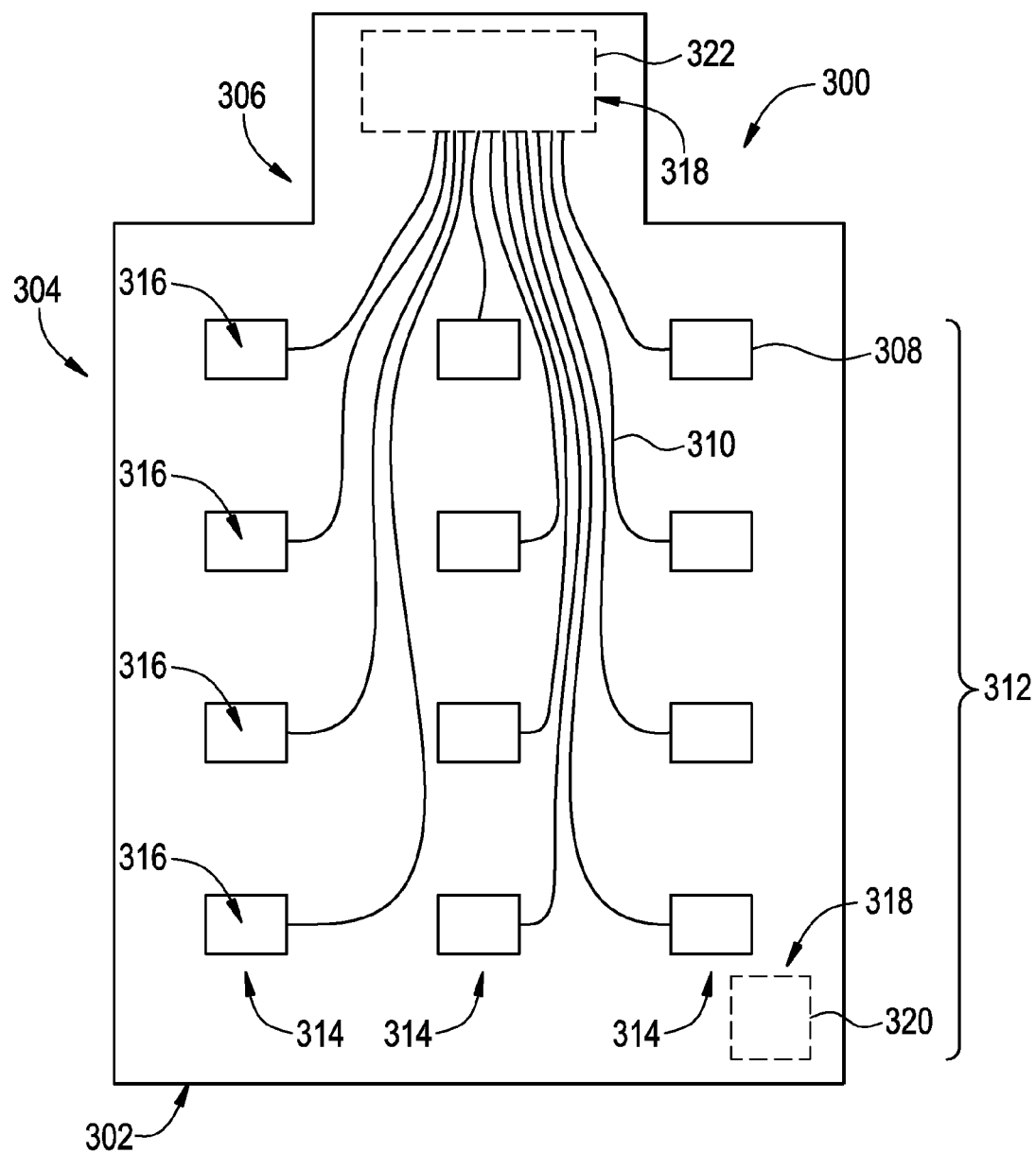
FIG. 3 is a top, plan view of an example of a sensing platform for use with a battery cell, such as the battery cells of FIGS. 1-2.

With reference now to FIG. 3 of the drawings, an example is illustrated of a sensing platform 300 that is made in accordance with concepts of the present invention. The sensing platform 300 can comprise a substrate 302 that has a sensing portion 304 and lead out terminals 306. The sensing platform 300 can also comprise a plurality of sensing elements 308, and interconnect wires 310, which couple individual (or groups) of the sensing elements 308 to the lead out terminals 306 so as to permit the collection of data using the sensing platform 300.

Again, while the sensing platform 300 can also comprise a single sensing element 308, in the present example of the sensing platform 300 of FIG. 3, the sensing platform 300 can also comprise a sensing array 312, which has the sensing elements 308 arranged in the sensing portion 304. The sensing array 312 can have a number of rows 314, and a number of columns 316. The number of rows 314 and columns 316 can vary, but in one construction is can be determined in accordance with the number of measurement points from which data is to be collected. It is illustrated in FIG. 3 for example that the sensing array 312 has three (3) rows and four (4) columns, and therefore there are twelve (12) of the sensing elements 308. This arrangement corresponds to twelve (12) measurement points available within the sensing portion 304 of the sensor platform 300. Although the number of sensing elements 308 is limited in one aspect by the resolution of the processing and manufacturing techniques, it may be desirable that the sensing array 312 has at least about nine (9) measurement points, and in a more particular example the number of measurement points can be from about twelve (12) to about eighty-one (81) (e.g., a 9×9 array of the sensing elements 138 (FIG. 1)).

In one embodiment, the sensing platform 300 may further comprise a data transmitting structure 318 that can include one or more of a wireless transmitting structure 320 and a signal conditioning device 322, both of which can be coupled to one or more of the sensing elements 308. This connection can be accomplished using wires, like the interconnect wires 310. The data transmitting structure 318 can be used to transmit the data collected by the sensing elements 308 to the outside of the battery cell, e.g., battery cell 100 (FIGS. 1 and 2). This is beneficial because the data transmitting structure 318 can simplify the construction of the sensing platform 300, e.g., by eliminating at least a portion of the lead out terminals 306 in lieu of transmitting data wirelessly, e.g., through the cell wall of the battery cell.

In connection with the preceding discussion, the sensing platform 300 may comprise multi-layer structures as well as other variations that comprise the materials that are disclosed and discussed herein. Materials that are used to construct the sensing platform 300 can also be used in conjunction with, or in addition to, other materials, wherein the latter material are actually responsive to the physical stimulus. In one example, a metal conductor may be deposited onto one or more ceramic layers, which are in turn deposited on the surface of the substrate 302.

The substrate 302, in many embodiments of the battery cell, can be a thin, organic substrate with physical properties consistent with thin, flexible, sheet-like materials. The appropriate material for use as the substrate may depend upon the intended use and environment of the sensing elements that are disposed thereon. Polyimide materials such as, but not limited KAPTON polyimide, and UPILEX polyimide provide a rugged, yet flexible material that is suitable for material deposition, and more particularly, for receiving deposition materials of the types used for the sensing elements described above. These materials may be deposited onto the substrate using a variety of techniques described above including, but not limited to, spraying, laminating, and sputtering, among others. In one example, the sensing platform 300 can comprise an aluminum coating (not shown) that is applied so as to increase its rigidity, as well as to improve adhesion between the sensing platform 300 and the cell wall of the battery cell. Because such processes are generally recognized by those having ordinary skill in the art, details of these processes are not necessary and thus not provided herein unless needed to explain one or more concepts of the present invention.

The signal conditioning device 320 can be configured so as to receive the sensor data and provide communication, e.g., digital communication, with an exterior device in lieu of serial wire connections. Examples of devices for use as the signal condition device 320 can include, but are not limited to, multi-plexers, ASICs, and other processing devices that can act as an intermediary between the sensing elements 308 and any external device. Examples of devices and implements that the data transmitting structure 318 can include wireless devices such as a radio frequency identification ("RFID") device. It is also contemplated that the data transmitting structure 318 can comprise components (and or electrical circuitry) that can be used to couple the sensing platform 300, and/or the sensing elements 308 to complementary devices outside of the battery cell so as to transmit the data outside of the battery cell. Details of one example of such coupling can be had by way of the sensing platform 400 that is illustrated in FIGS. 4-6, and discussed in more detail below.

Figure 4:
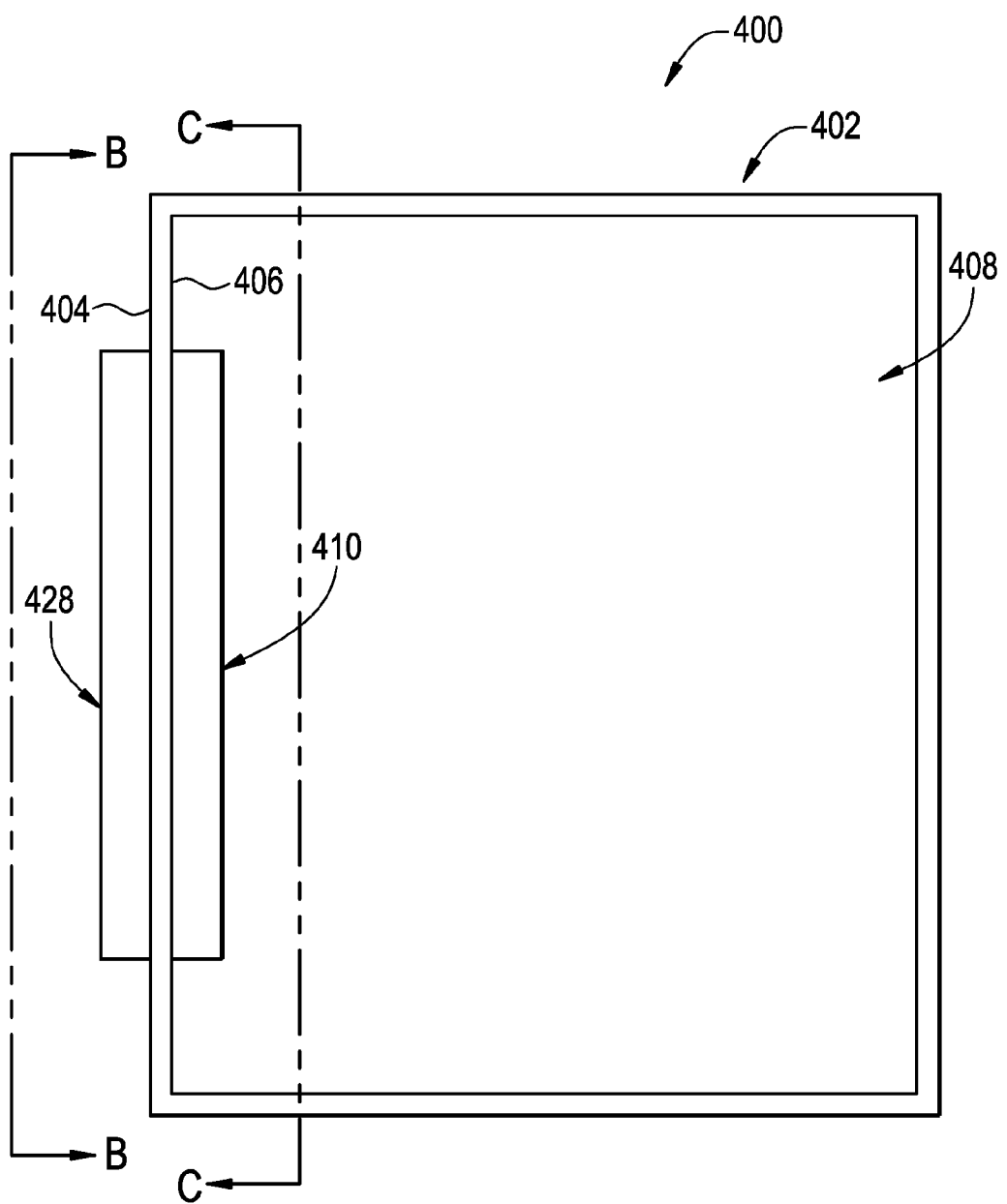
FIG. 4 is a front, cross-section view of another example of a battery cell that is made in accordance with the present invention.
Figure 5:
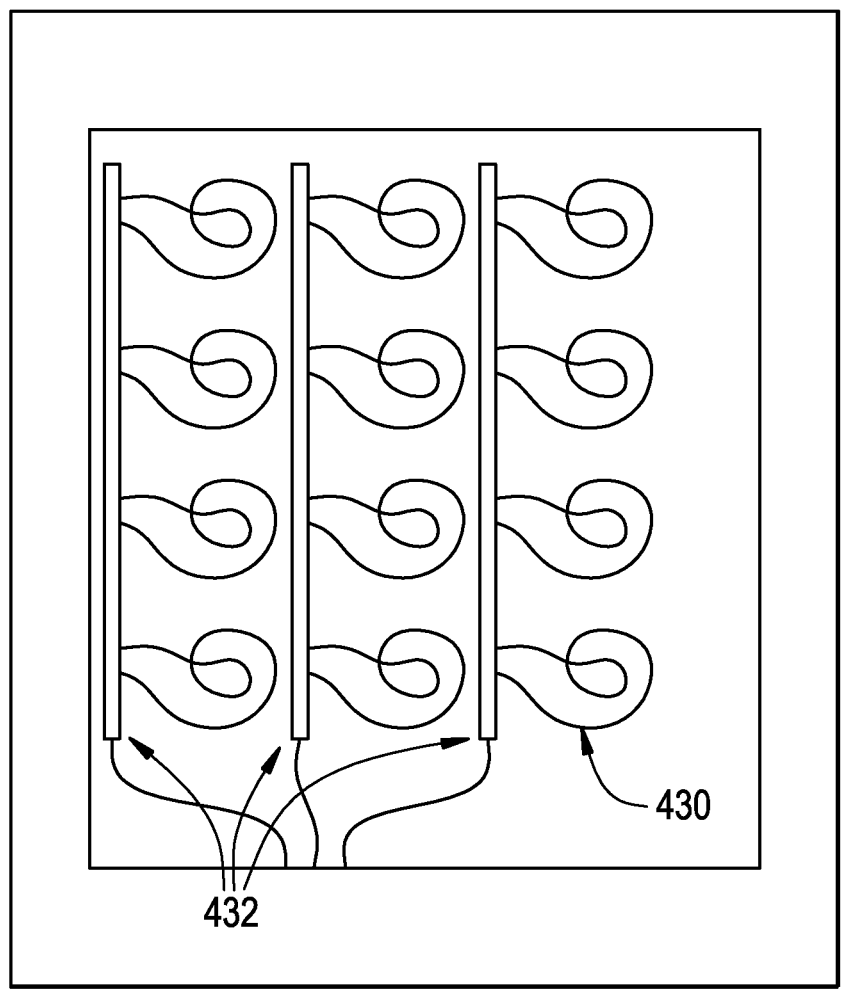
FIG. 5 is a side view of the battery cell of FIG. 4, wherein the battery cell comprises a data receiving structure disposed on an outer surface of a cell wall of the battery cell.
Figure 6:
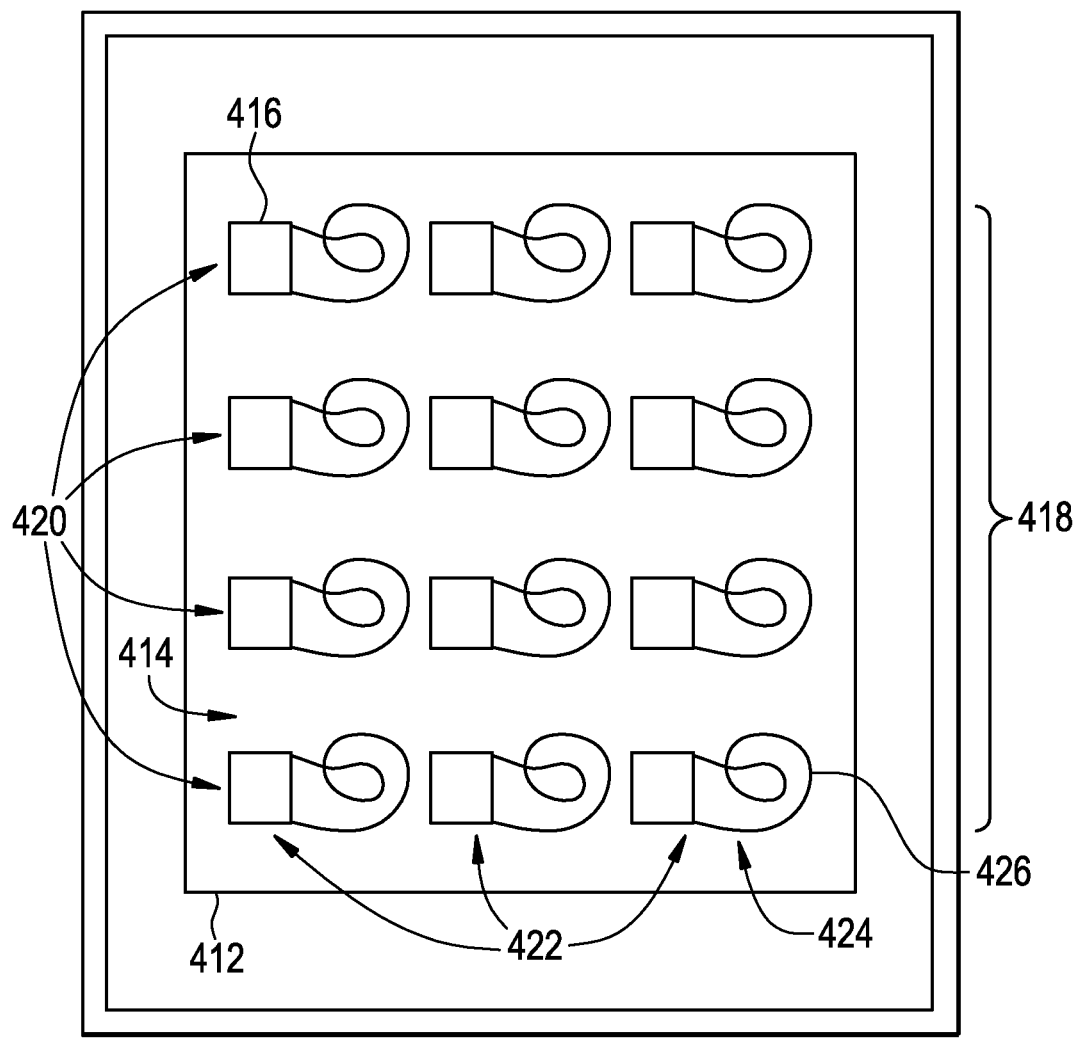
FIG. 6 is a side, cross-section view of the battery cell of FIG. 4, wherein the battery cell comprises a sensor platform such as the sensor platform of FIG. 3.

That is, and with reference now to FIGS. 4-6, another example of a battery cell 400 is seen that is configured to transmit data via coupling, and more particularly via inductively coupling through the cell wall of the battery cell. In this example, the battery cell 400 can comprise a cell wall 402 with an outer surface 404, and an inner surface 406 which forms an inner volume 408, which is similar to the inner volume 128 of FIG. 1 above. The battery cell 400 can also comprise a sensing platform 410 that is disposed in the inner volume 408, and bonded or otherwise secured to the inner surface 406 using one or more of the processes and techniques discussed above.

The sensing platform 410 can comprise a substrate 412 that has a sensing portion 414, and a plurality of sensing elements 416. The sensing elements 416 can be arranged in a sensing array 418 having rows 420 and columns 422. The sensing platform 410 can also comprise a plurality of data transmitting structures 424, and in this example each of the data transmitting structures 424 can comprise a first inductive coil 426 that is coupled to the sensing elements 416.

The battery cell 400 can further comprise a data receiving structure 428 that can have a plurality of second inductive coils 430 and an interconnect routing structure 432 such as conductive (e.g., metallic) wires that are coupled to the second inductive coils 430. These wires can conduct signals from the second inductive coils 430 to another portion of the data receiving structure 428. This portion may be a centralized interconnect terminal or structure that is, in one embodiment, coupled to an external device configured to process data collected by the sensing elements 416.

In one embodiment, the data receiving structure 428 is disposed on the outer surface 404 of the cell wall 402 in opposing relation to the sensing platform 410. This can be done with adhesives, laminated films, welding, as well as by one or more of the direct-write techniques discussed above. This position can align the second inductive coils 430, and the first inductive coils 426 so as to facilitate communication of the signals across the cell wall 402, e.g., by inductively coupling effects.

Figure 7:
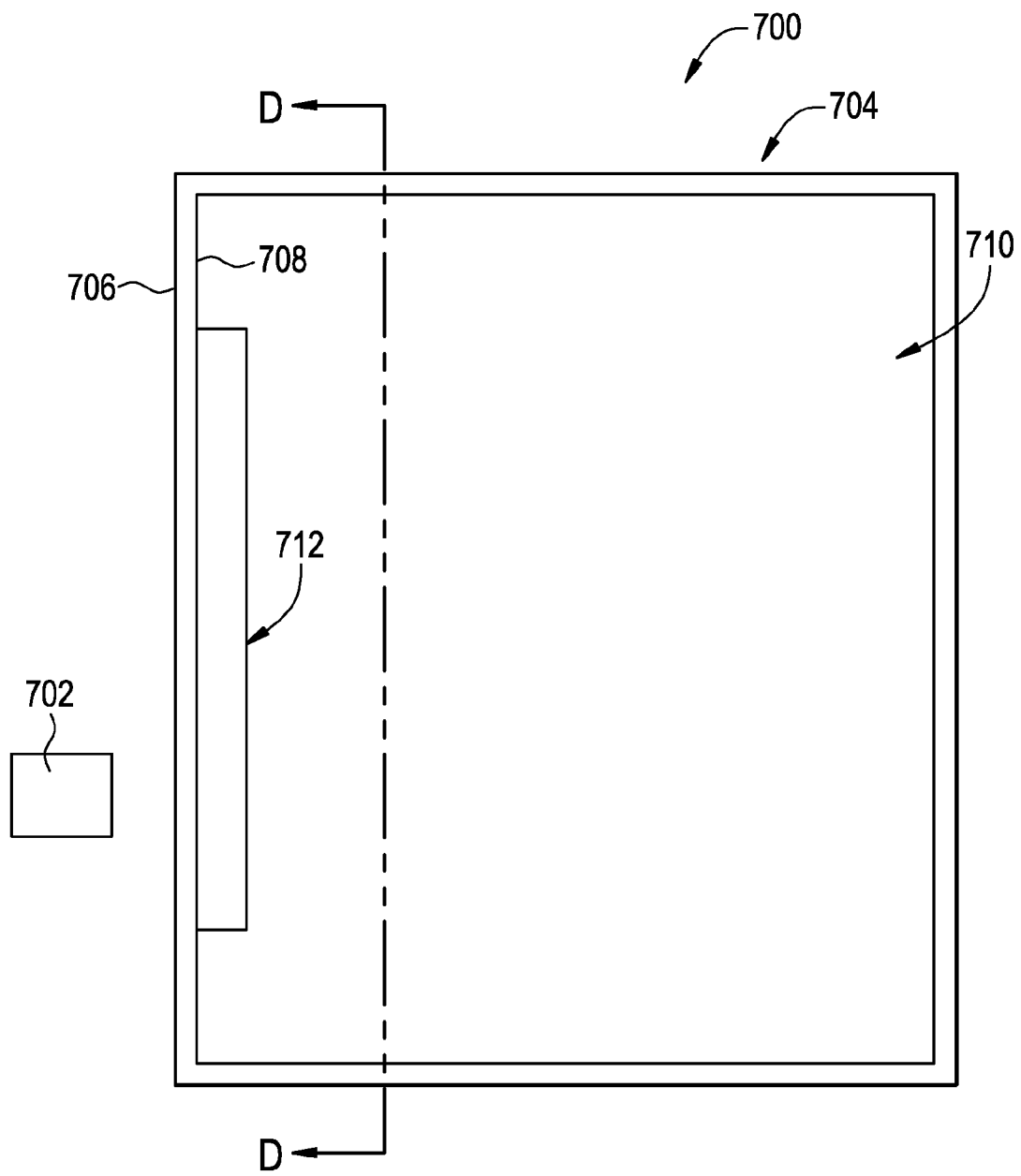
FIG. 7 is a front, cross-section view of yet another example of a battery cell that is made in accordance with the present invention.
Figure 8:
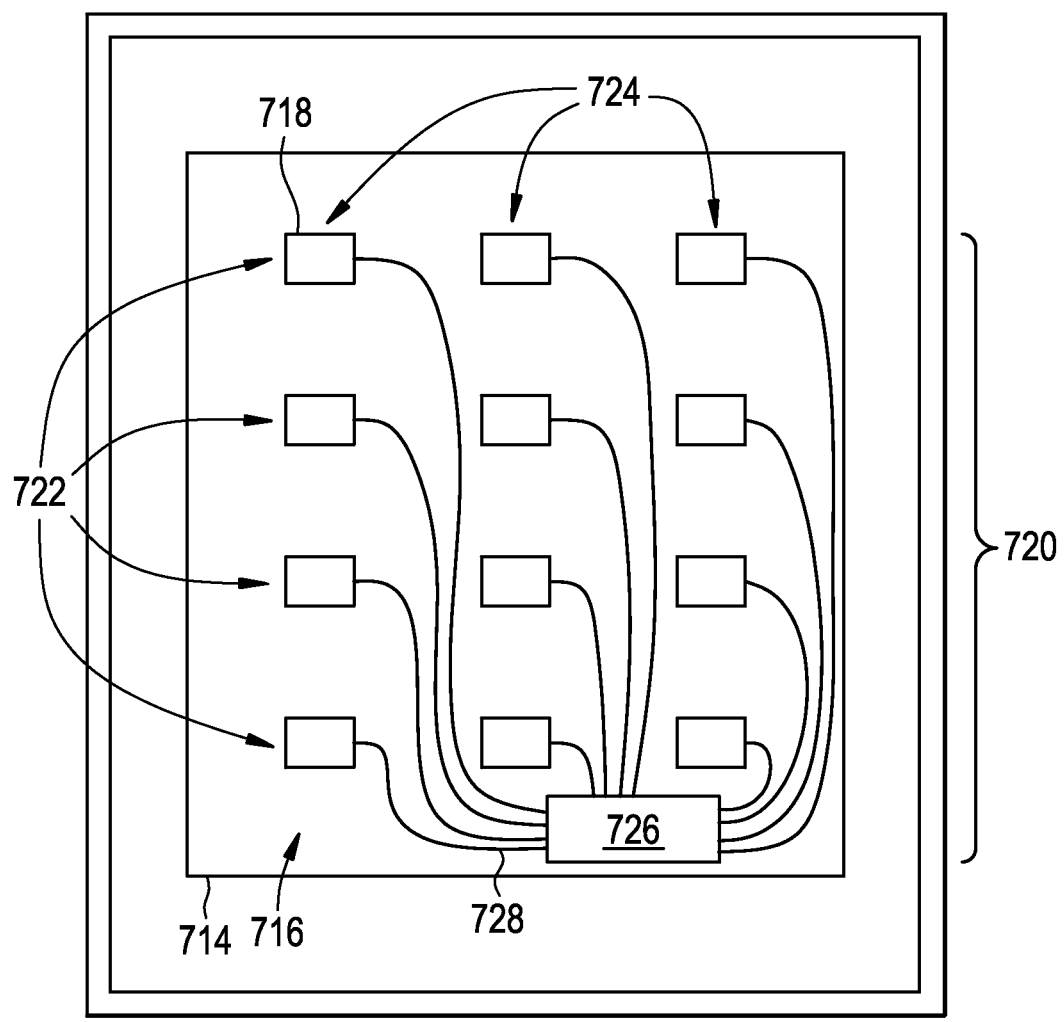
FIG. 8 is a side view of the battery cell of FIG. 7, wherein it is shown an external device that is configured to receive data from the battery cell.

As another example it is seen in FIGS. 7 and 8 that a battery cell 700 is also configured to transmit data via coupling to an external device 702. By way of non-limiting example, the battery cell 700 can comprise a cell wall 704 with an outer surface 706, and an inner surface 708 which forms an inner volume 710, which is similar to the inner volume 128 of FIG. 1 above. The battery cell 700 can also comprise a sensing platform 712 that is disposed in the inner volume 710, and bonded or otherwise secured to the inner surface 708 using one or more of the processes and techniques discussed above. The sensing platform 712 can comprise a substrate 714 that has a sensing portion 716, and a plurality of sensing elements 718. The sensing elements 718 can be arranged in a sensing array 720 having rows 722 and columns 724.

The sensing platform 712 can also comprise a central hub device 726 such as a serializer, a multiplexer, and a processor such as an ASIC. The sensing platform 712 can further comprise interconnect wires 728, which couple the sensing elements 718 to the central hub device 726. The central hub device 726 can be configured to process the signals from the sensing elements 718, so that these signals can be provided to the external device 702. In one embodiment, the central hub device 726 may comprise an inductive coil, e.g., an inductive coil 430 (FIG. 6), and/or other structure that can be used to provide a signal to the external device 702. It is noted that rather than coupling individual sensing elements 718 to the exterior of the battery cell, the data from the sensing elements 718 is routed to the central hub device 726. The central hub device 726 can be coupled to the external device 702, which is located outside of the battery cell. This arrangement can simplify the construction of the battery cell 700 such as by eliminating the need for corresponding indicative coils on the outside of the cell wall. In one embodiment, the external device 702 can comprise an antenna or other feature which is responsive to the central hub device 726.

Figure 9:
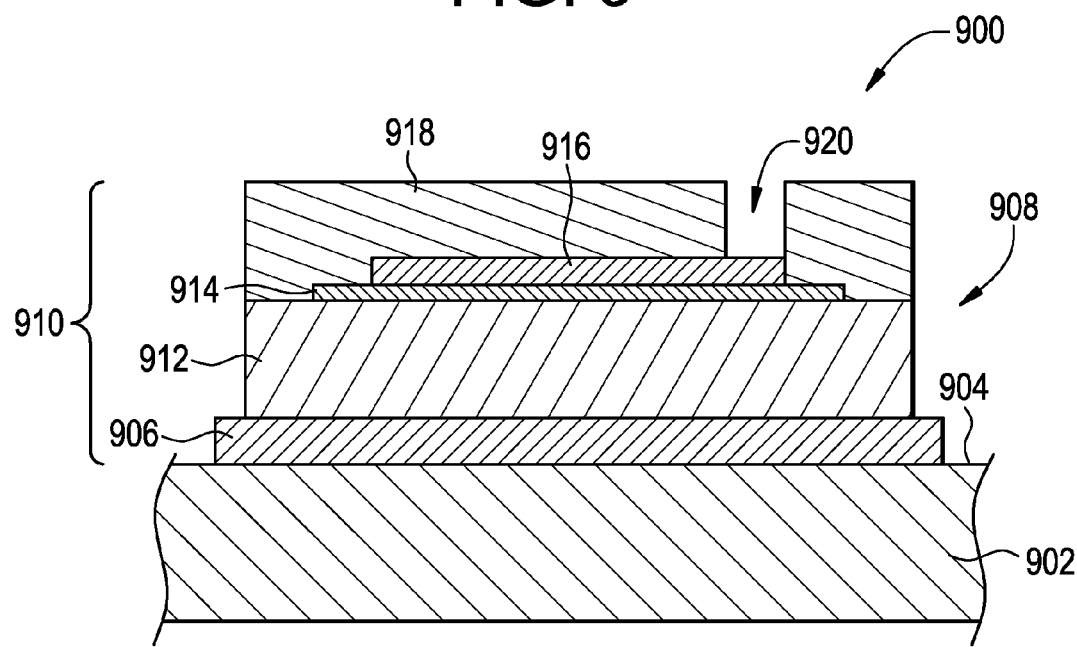
FIG. 9 is a partial, side, section view of yet another example of a battery cell that is made in accordance with the present invention, wherein the battery cell incorporates a sensing platform such as the sensing platform of FIG. 3.

Referring next to FIG. 9, a partial, detailed view of another example of a battery cell 900 is illustrated. For clarity, some of the parts of the battery cell have been removed, with emphasis being placed on the particular configuration of the structure of the battery cell illustrated therein. In this example, the battery cell 900 comprises a cell wall 902 with a surface 904 on which is provided a bonding structure 906. The battery cell 900 also comprises a sensing platform 908 disposed on the bonding structure 906. The sensing platform 908 can comprise a plurality of material layers 910, which include a substrate layer 912, a sensing layer 914, an interconnect layer 916, and a passivation layer 918.

The surface 904 can be the outer surface of the battery cell (such as the outer surface 124 of the cell wall 122 of FIG. 1). The surface 904 can also be the inner surface of the battery cell (such as the inner surface 126 of the cell wall 122 of FIG. 1). As discussed above, the bonding structure 906 can be formed by using the various processes and techniques for bonding the sensing platform to the cell wall of the battery cell. Examples of bonding structures for use as the bonding structure 906 include, but are not limited to, adhesives (and adhesive layers), welds and weldments, as well laminated and other polymer layers.

The substrate layer 912 can be a KAPTON and/or LCP layer onto which is deposited other ones of the material layers, e.g., material layers 910. The selection of the substrate material can depend on a variety of factors, such as the risk of ingress of the electrolyte from the battery cell into the sensing element, and more particularly the sensing layer 914. The substrate layer 912 can have a thickness of less than about 0.025 mm, with one construction of the substrate layer 912 having a thickness from about 0.0125 mm to about 0.25 mm.

Material for use as the sensing layer 914 can be deposited onto the substrate layer 912 by sputtering, electroplating, or evaporation methods. This material can be selected based on the type of sensing elements selected for use on the sensing platform 908. In exemplary sensing platforms suitable for use as the sensing platform 908, the sensing layer 914 can have a thickness of less than about 1 mm, from about 0 mm to about 0.5 mm, and in one construction of the sensing platform 908 the sensing layer 914 has a thickness that is less than about 0.05 mm. In one example, a copper-nickel (Cu/Ni) alloy can be used to form the sensing elements for use as strain gages. In another example, platinum can be used to for the sensing elements for use a temperature sensors. The materials can also be selected based on the material properties, desired sensitivity of the sensing element, as well as the processing compatibility of the desired material that is selected for the sensing layer 914.

The interconnect layer 916 can be deposited onto the sensing layer 914. The interconnects can couple the sensing elements to the buss, the lead out portion (e.g., the lead out portion 306), and the data transmitting device (e.g., the data transmitting device 312), as well as other parts of the sensing platform 908. This layer can be generally formed of a conductive material such as copper (Cu) alloy, which is used for interconnects (and interconnect routing). In one example, copper is used as the material of the interconnect layer 916, in addition to an adhesion layer (not shown) of titanium. The interconnect layer 916 in exemplary sensing platforms suitable for use as the sensing platform 908 can have a thickness of less than about 0.008 mm, from about 0.004 mm to about 0.008 mm, and in one construction of the sensing platform 908 the interconnect layer 916 has a thickness that is at least about 0.005 mm.

The passivation layer 918 is applied to protect and/or isolate the interconnects from the environment, e.g., the electrolyte solution inside of the battery cell 900. An opening, e.g., opening 920 can be formed in the passivation layer 910 to allow for connections to portions of the subjacent layers, such as the interconnect layer 916, and/or the sensing layer 914. One exemplary material for use in the passivation layer 918 is parylene, which is known to have excellent moisture resistance while being able to adhere to a variety of materials. Other materials that can be used for the passivation layer 910 include, but are not limited to, teflon, and metallic coatings, among others. In exemplary sensing platforms suitable for use as the sensing platform 908, the passivation layer 918 can have a thickness of less than about 1 mm, from about 0 mm to about 0.5 mm, and in one construction of the sensing platform 908 the passivation layer 918 has a thickness that is at least about 0.05 mm.

Figure 10:
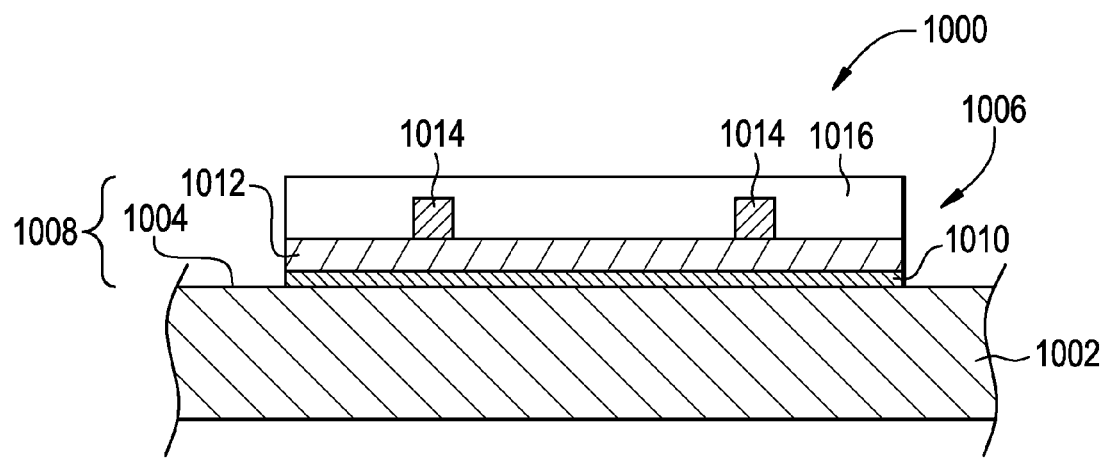
FIG. 10 is a partial, side, section view of still another example of a battery cell that is made in accordance with concepts of the present invention, wherein the battery cell incorporates a sensing platform such as the sensing platform of FIG. 3.

Another partial, detailed view of an example of a battery cell 1000 is illustrated in FIG. 10. Here, as in the example of the battery cell 900 of FIG. 9, certain aspects of the battery cell 1000 are not shown for clarity and to emphasize certain concepts of the present invention. For example, in this example the battery cell 1000 can comprise a cell wall 1002 with a surface 1004, on which is disposed a sensing platform 1006. The sensing platform 1006 can comprise a plurality of material layers 1008, wherein the construction of the material layers 1008 is formed directly on the surface 1004 of the cell wall 1002. This surface 1004 can be any one of the inner surface, and the outer surface of the cell wall, such as the outer surface 124, and the inner surface 126 of the cell wall 122 in FIG. 1 above.

The construction of the sensing platform 1006, and more particularly the material layers 1008 can be realized in one example by utilizing one or more of the direct-write techniques, such as the plasma spray and/or paste deposition technique discussed and referenced above. These techniques permit the sensing platform 1006 and its components (e.g., the sensing elements (not shown)) to be incorporated as part of the structure of embodiments of the battery cell, e.g., the battery cell 1000. Such techniques are typically more efficient and less expensive because they often do not require such steps as masking, chemical etching, or other major surface preparation of the base materials that is required with other deposition, sputtering, and spinning processes.

It is seen in FIG. 10 that the material layers 1008 can comprise a bondcoat layer 1010, an electrical insulator layer 1012, a sensing layer 1014, and an overcoat layer 1016. The exact number and arrangement of the material layers 1008 can, of course, depend on many factors, and so the depiction in the present example is not meant to limit the scope and spirit of the present disclosure. That is, development and construction of the sensing platform 1006 in the battery cell 1000 when using the direct-write techniques can use more or less layers, e.g., material layers 1008, to provide sensing elements (and the sensing array) for measuring and collecting data of the in-situ characteristics and parameters of the battery cell.

The bondcoat layer 1010 can be selected for use with the material of the cell wall 1002 and/or the surface 1004 on which the bondcoat layer 1010 is deposited. The bondcoat layer 1010 can be a conductive material (e.g., metallic) that is selected for its particular properties that permit it to adhere to the subjacent cell wall 1002, as well as to permit other adjacent layers to be deposited thereon. In one example, the bondcoat layer 1010 can be the same as the surface 1004. In exemplary sensing platforms suitable for use as the sensing platform 1006, the bondcoat layer 1010 can have a thickness of less than about 1 mm, from about 0 mm to about 0.5 mm, and in one construction of the sensor platform 1000 the bondcoat layer 1010 has a thickness of at least about 0.05 mm.

These adjacent layers can comprise the insulator layer 1012, which can be a polymeric or ceramic dielectric material, and the sensing layer 1014 made of deposited Cu/Ni alloys, titanium, and any temperature sensing materials including thermistors and thermocouples (e.g., Types K, N, R, and B). The insulator layer 1012 may comprise materials with insulating properties, such properties being selected so as to insulate the sensing layer 1014 from the bondcoat 1010, and to a lesser extent from the cell wall 1002. In one example, the insulator layer 1012 can be the same as the surface 1004. In exemplary sensing platforms suitable for use as the sensing platform 1006, the insulating layer 1012 can have a thickness of less than about 1 mm, from about 0 mm to about 0.5 mm, and in one construction of the sensing platform 1006 the insulator layer 1012 has a thickness of at least about 0.05 mm.

The overcoat layer 1016 is deposited over the sensing layer 1014 so as to protect the sensing layer 1014 from the environment. This layer can also comprise a material that is selected for its protective properties, e.g., moisture absorption, corrosion protection, among others. In exemplary sensing platforms suitable for use as the sensing platform 1006, the overcoat layer 1016 can have a thickness of less than about 2 mm, from about 0 mm to about 1 mm, and in one construction of the sensing platform 1006 the overcoat layer 1016 has a thickness that is at least about 0.05 mm. The thickness can also be determined by the cell operating conditions and other design aspects, e.g., dimensions of the battery cell 1000.

Figure 11:
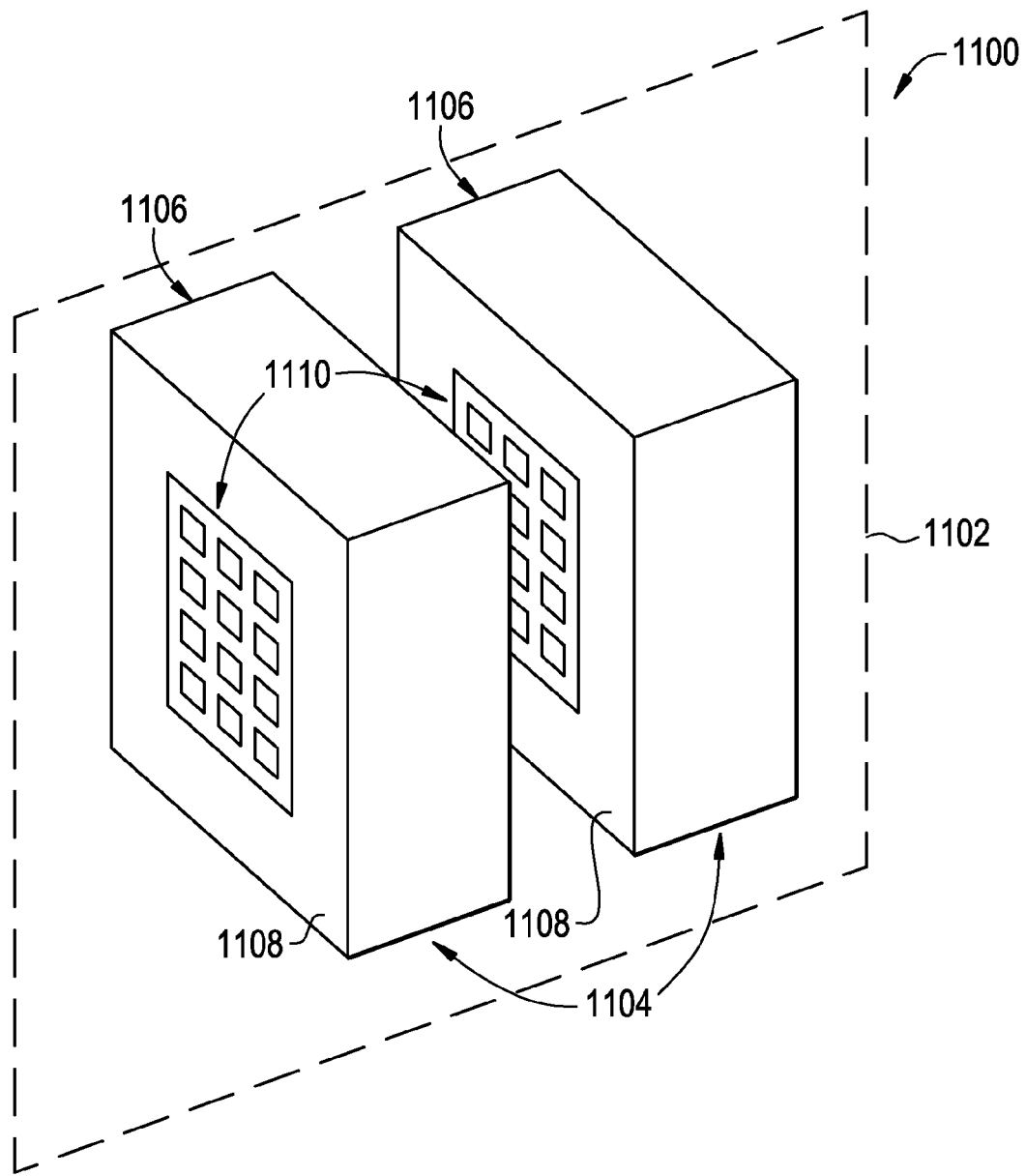
FIG. 11 is a top, perspective, exploded assembly view of an example of a battery pack that comprises a plurality of battery cells, such as the battery cells of FIGS. 1, 2, and 4-11.
Figure 12:
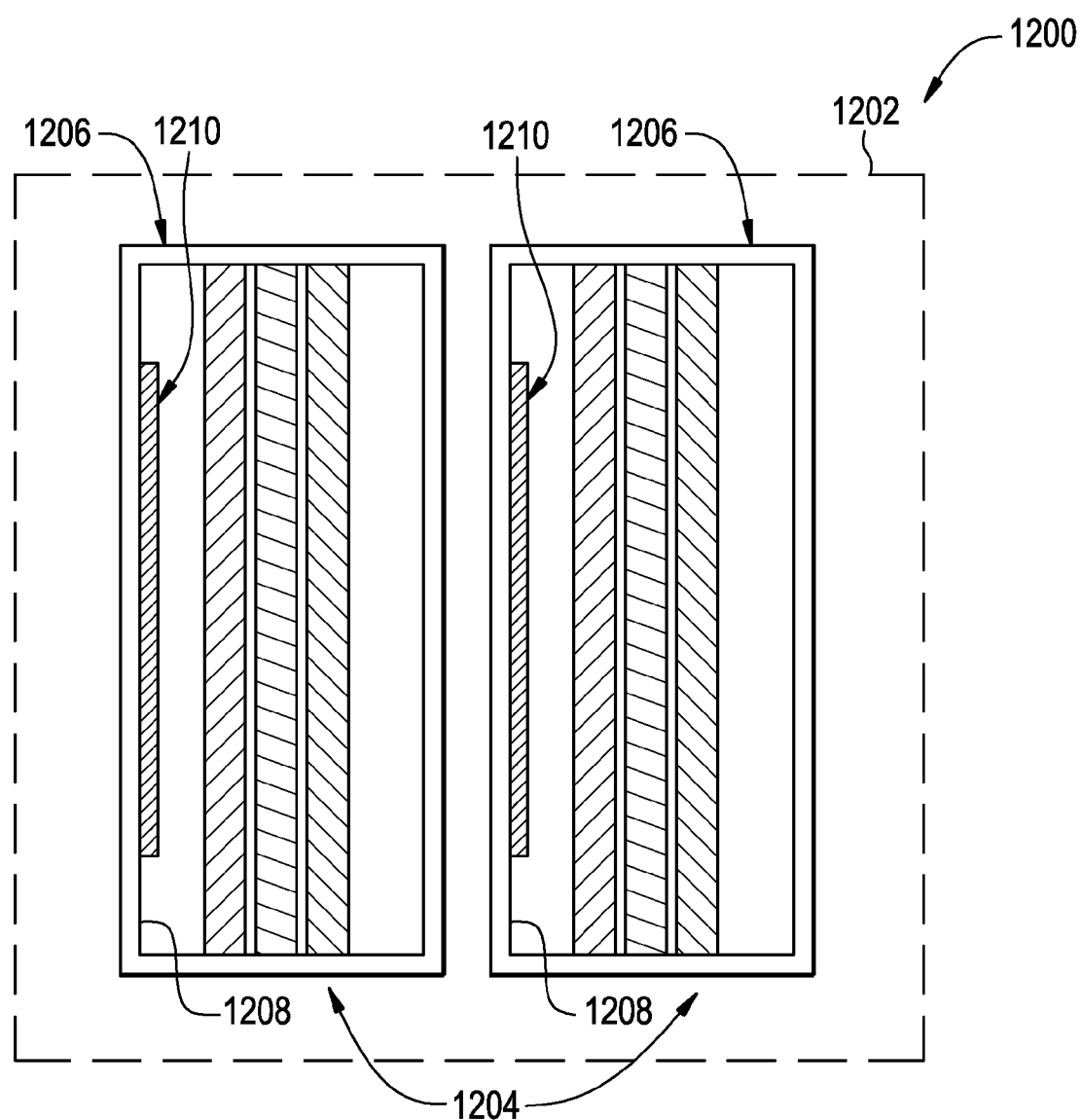
FIG. 12 is a front, cross-section, exploded assembly view of another example of a battery pack that comprises a plurality of battery cells, such as the battery cells of FIGS. 1, 2, and 4-11.

Discussing the implementation of the sensing platform generally, and the battery cells in particular, it is seen illustrated in FIGS. 11 and 12 examples of a battery pack 1100, 1200, (the "battery packs"). These battery packs comprise a plurality of battery cells, which are constructed in accordance with the concepts of the present invention. In FIG. 11, for example, there is provided an example of a battery pack 1100 that comprises a battery pack housing 1102, a plurality of battery cells 1104, each of which can comprise a cell wall 1106 with an outer surface 1108. The battery cells 1104 also comprise a sensing platform 1110, which can be disposed on the outer surface 1108 of the battery cells 1104.

The sensing platforms 1110 can be individual structures, such as would be found using flexible substrates like KAPTON. These substrates can be secured to the outer surface 1108 of the cell wall 1106 using any one of the processes discussed above, or contemplated within the scope and spirit of the present disclosure. The sensing platforms 1110 can also be integrated onto the outer surface 706 of the cell wall 704, such as would be found using the direct-write technique described above.

In FIG. 12, there is provided another example of a battery pack 1200 that comprises a battery pack housing 1202, and a plurality of battery cells 1204. It is seen that the battery cells 1204 can comprise a cell wall 1206 that has an inner surface 1208. The battery cells further comprise a sensing platform 1210 that is located on the inner surface 1208 of the cell wall 1206. In one example, one or more of the sensing platforms 1210 can be a separate structure that is secured to the inner surface 1208. In another example, the sensing platforms 1210 can be integrated onto the inner surface 1208 using one or more of the direct-write techniques described above.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An energy storage cell comprising:
a cell wall having an inner surface and an outer surface;
a first electrode;
a second electrode positioned relative to the first electrode in a manner generating electrochemical activity between the first electrode and the second electrode;
an active region responsive to the electrochemical activity, the active region comprising a plurality of localized measurement regions exhibiting a cell property;
a sensing platform coupled to the inner surface of the cell wall proximate the localized measurement regions, the sensing platform comprising a plurality of data transmitting structures each comprising a first inductive coil coupled to each of a plurality of sensing elements for collecting and transmitting data corresponding to the cell property in each of the localized measurement regions; and
a data receiving structure coupled to the outer surface of the cell wall, the data receiving structure spaced apart and separated from the sensing platform by the cell wall, the data receiving structure comprising at least one second inductive coil receiving the transmitted signals from the plurality of data transmitting structures,
wherein the plurality of sensing elements comprises a temperature sensing element and a strain sensing element for measuring, respectively, temperature and strain at the localized measurement regions.

2. An energy storage cell according to claim 1, wherein the localized measurement regions are proximate one or more of the first electrode and the second electrode.

3. An energy storage cell according to claim 1, wherein the cell wall is in surrounding relation to the first electrode and the second electrode and the outer surface and the inner surface of the cell wall form a cell volume, wherein the localized measurement regions are enclosed inside of the cell volume.

4. An energy storage cell exhibiting a cell property, said energy storage cell comprising:
a first electrode;
a second electrode positioned relative to the first electrode in a manner generating electrochemical activity between the first electrode and the second electrode;
a cell wall in surrounding relation to the first electrode and the second electrode, the cell wall comprising an outer surface and an inner surface forming a cell volume;
an active region responsive to the electrochemical activity, the active region comprising a plurality of localized measurement regions exhibiting a cell property;
a sensing platform coupled to the inner surface of the cell wall proximate the plurality of localized measurement regions, the sensing platform comprising a plurality of data transmitting structures each comprising a first inductive coil coupled to each of a plurality of sensing elements substantially enclosed inside of the cell volume, the plurality of sensing elements for collecting data corresponding to the cell property in each of the localized measurement regions; and
a data receiving structure coupled to the outer surface of the cell wall, the data receiving structure spaced apart and separated from the sensing platform, the data receiving structure comprising at least one second inductive coil receiving the transmitted signals from the plurality of data transmitting structures.

5. An energy storage cell according to claim 4, wherein each of the sensing elements are spaced from each other so as to form a sensing array that substantially covers the active region.

6. An energy storage cell according to claim 4, wherein the sensing platform comprises a plurality of material layers, and wherein the material layers comprise a sensing layer responsive to the cell property.

7. An energy storage cell according to claim 6, wherein the sensing platform comprises a polymer film, wherein the plurality of material layers are disposed on the polymer film, and wherein the polymer film is bonded to the inner surface.

8. An energy storage cell according to claim 6, wherein the material layers comprise a first layer disposed on the inner surface.

9. A battery cell for use in a battery pack, said battery cell comprising:
a first electrode;
a second electrode positioned relative to the first electrode in a manner generating electrochemical activity between the first electrode and the second electrode;

a cell wall in surrounding relation to the first electrode and the second electrode, the cell wall comprising an outer surface and an inner surface forming a cell volume;

an active region responsive to the electrochemical activity, the active region comprising a plurality of localized measurement regions exhibiting a cell property;

a sensing platform coupled to the inner surface of the cell wall proximate the localized measurement regions, the sensing platform comprising a plurality of data transmitting structures each comprising a first inductive coil coupled to each of a plurality of sensing elements disposed on the outer surface of the cell wall, the plurality of sensing elements for collecting data corresponding to the cell property in the localized measurement regions; and a data receiving structure coupled to the outer surface of the cell wall, the data receiving structure spaced apart and separated from the sensing platform by the cell wall, the data receiving structure comprising at least one second inductive coil receiving the transmitted signals from the plurality of data transmitting structures, wherein the plurality of sensing elements comprises a temperature sensing element and a strain sensing element for measuring, respectively, temperature and strain at the localized measurement regions.

10. A battery cell according to claim 9, wherein the sensing elements comprise a sensing layer responsive to temperature and strain.

11. A battery cell according to claim 10, wherein the sensing platform comprises a plurality of material layers, and wherein the plurality of layers comprise a polymer film bonded to the outer surface and a conductive layer for interconnecting the sensing elements.

12. A battery cell according to claim 10, the material layers having a first layer of material disposed on the outer surface.

13. A battery cell according to claim 9, wherein the sensing elements are spaced from each other so as to form a sensing array that substantially covers the localized measurement regions.

14. A battery cell according to claim 9, wherein the localized measurement regions comprise the cell wall.

15. The energy storage cell of claim 1, wherein the plurality of sensing elements comprises at least one of a temperature sensing element, strain sensing element, current sensing element, voltage sensing element, and/or pressure sensing element for measuring, respectively, temperature, strain, current, voltage, and/or pressure at the localized measurement regions.

16. The energy storage cell of claim 4, wherein the plurality of sensing elements comprises at least one of a temperature sensing element, strain sensing element, current sensing element, voltage sensing element, and/or pressure sensing element for measuring, respectively, temperature, strain, current, voltage, and/or pressure at the localized measurement regions.

17. The battery cell of claim 9, wherein the plurality of sensing elements comprises at least one of a temperature sensing element, strain sensing element, current sensing element, voltage sensing element, and/or pressure sensing element for measuring, respectively, temperature, strain, current, voltage, and/or pressure at the localized measurement regions.

* * * * *